United States Patent

Morris et al.

[11] 4,296,811
[45] Oct. 27, 1981

[54] METHOD FOR PERMEABILITY CORRECTION BY IN SITU GENESIS OF MACROEMULSIONS IN HARD BRINE

[75] Inventors: Charles W. Morris, Sante Fe Springs, Calif.; Ronald E. Terry, Lawrence, Kans.

[73] Assignee: Phillips Petroleum Company, Bartlesville, Okla.

[21] Appl. No.: 922,453

[22] Filed: Jul. 6, 1978

[51] Int. Cl.³ .................... E21B 33/138; E21B 43/22
[52] U.S. Cl. .................... 166/273; 166/274; 166/294
[58] Field of Search ............ 166/273, 274, 275, 294, 166/305 R; 252/8.55 D

[56] References Cited

U.S. PATENT DOCUMENTS

| | | | |
|---|---|---|---|
| 3,343,599 | 9/1967 | Eddins, Jr. et al. | 166/294 |
| 3,358,758 | 12/1967 | Hardy et al. | 166/274 |
| 3,373,809 | 3/1968 | Cooke, Jr. | 166/273 |
| 3,587,737 | 6/1971 | Tosch | 166/275 X |
| 3,604,508 | 9/1971 | Son, Jr. | 166/294 |
| 3,792,731 | 2/1974 | Feverbacher et al. | 166/274 |
| 3,866,680 | 2/1975 | Dauben | 166/273 |
| 3,983,940 | 10/1976 | Carpenter, Jr. et al. | 166/273 |
| 4,066,124 | 1/1978 | Carlin et al. | 166/273 X |
| 4,079,785 | 3/1978 | Hessert et al. | 166/273 |
| 4,125,158 | 11/1978 | Waite et al. | 166/273 |
| 4,159,037 | 6/1979 | Varnon et al. | 166/273 X |
| 4,160,480 | 7/1979 | Schievelbein et al. | 166/273 X |
| 4,161,982 | 7/1979 | Schievelbein et al. | 166/273 X |
| 4,161,983 | 7/1979 | Schievelbein | 166/273 X |
| 4,184,549 | 1/1980 | Schievelbein | 166/273 X |

*Primary Examiner*—Stephen J. Novosad
*Assistant Examiner*—George A. Suchfield

[57] ABSTRACT

Sweep efficiency of a post-primary oil recovery process in an oil-bearing subterranean formation containing a high concentration of divalent ions such as $Ca^{++}$ and $Mg^{++}$ in the connate water is improved by injecting a surfactant system which forms a macroemulsion in situ so as to selectively plug the more permeable zones. The surfactant system is characterized by a relatively low viscosity and is composed of a predominantly sodium chloride brine, a petroleum sulfonate surfactant, a cosurfactant, and no more than 1 percent oil. This composition possesses sufficient fluidity to penetrate quite deeply into the formation and yet tends to form a macroemulsion on contact with high concentrations of divalent ions in the connate water so as to selectively plug the more permeable zones.

17 Claims, No Drawings

METHOD FOR PERMEABILITY CORRECTION BY IN SITU GENESIS OF MACROEMULSIONS IN HARD BRINE

BACKGROUND OF THE INVENTION

The problem of high permeability zones which tend to decrease the sweep efficiency of secondary and tertiary oil recovery operations is well known. Various methods are also known for plugging these more permeable zones. For instance, U.S. Pat. No. 3,866,680 discloses injecting a macroemulsion into a formation which tends to flow into the zones of greatest permeability thereby plugging same prior to tertiary recovery operations. However, injection of the macroemulsion involves many problems inherent in forming such a composition above ground. In addition, the material is initially a relatively viscous emulsion which is less capable of penetrating deeply into the formation as compared with the less viscous composition taught in the present process.

Surfactant systems for tertiary oil recovery employing petroleum sulfonate are well known. As a general rule, however, the use of these systems in hard brine connate water is avoided because of the tendency of the divalent ions contained therein to precipitate the sulfonate. For instance, U.S. Pat. No. 3,874,454 discusses this problem.

SUMMARY OF THE INVENTION

It is an object of this invention to selectively plug more permeable zones in a subterranean oil-bearing formation;

It is yet a further object of this invention to provide a system which is sufficiently fluid to penetrate deeply into a formation before forming a macroemulsion in situ to selectively plug more permeable zones;

It is yet a further object of this invention to avoid problems inherent in forming emulsions above ground and injecting same into a formation; and It is still yet a further object of this invention to provide improved tertiary recovery of oil from subterranean formations having high concentrations of divalent ions in the connate water.

In accordance with this invention, a surfactant system comprising a petroleum sulfonate surfactant, a cosurfactant, a predominantly sodium chloride brine and containing no more than 1 percent oil is injected into an oil-bearing subterranean formation having hard brine connate water so as to form a macroemulsion in situ to selectively plug high permeability zones.

DESCRIPTION OF THE PREFERRED EMBODIMENTS

The surfactant system used in accordance with this invention to selectively plug high permeation zones comprises: water; 0.5 to 12, preferably 1–7, more preferably 2–5 weight percent based on the weight of said water of a petroleum sulfonate surfactant having an average equivalent weight within the range of 375 to 500; 250 to 17,000 parts per million by weight of a predominantly sodium chloride electrolyte based on the weight of said water; and 1 to 12 weight percent cosurfactant based on the weight of said water which cosurfactant has a solubility in water within the range of 0.5 to 20, preferably 2 to 10 grams per 100 grams of water at 20° C. The percentages given for the petroleum sulfonate surfactant are based on the active ingredients disregarding any extraneous material that might be present. The surfactant systems of the type contemplated for plugging the more permeable zones in accordances with this invention are disclosed in Hessert et al, U.S. Pat. No. 4,079,785, the disclosure of which is hereby incorporated by reference, it being understood that the systems applicable for use in this invention to selectively plug the more permeable zones are limited to those having no more than 1 percent oil and no more than 17,000 parts per million sodium chloride electrolyte.

The sulfonates for use in the surfactant system used to selectively plug the more permeable zones are well known in the art and are sometimes referred to as alkyl arylsulfonates. They are also sometimes referred to as petroleum mahogany sulfonates. These sulfonates can be produced in the manner known in the art, for instance, by treatment of appropriate oil feed stocks with sulfuric acid and then neutralizing with an alkali metal or ammonium hydroxide. The equivalent weights referred to are average equivalent weights and there may be present significant amounts of sulfonates having an equivalent weight as low as 200 and as high as 650. Preferably, the average equivalent weights will be within the range of 400 to 425.

The cosurfactant can be any alcohol, amide, amine, ester, aldehyde or ketone containing 1–20 carbon atoms. The preferred materials are the $C_4$ to $C_7$ alcohols or mixtures thereof. Most preferred are $C_4$ and $C_5$ alcohols having a solubility within the above range. Isobutyl alcohol with a solubility of 9.5 grams per 100 grams of water is particularly suitable. Other preferred cosurfactants include secondary butyl alcohol, n-butyl alcohol, n-amyl alcohol, and isoamyl alcohol.

The brine constitutes 85–95 weight percent of the total composition including brine, surfactant, and cosurfactant. The brine is made up of water and an electrolyte which is predominantly sodium chloride and which contains no significant concentration of divalent ions. The electrolyte is present in the water in an amount within the range of 250 to 17,000, preferably 2,000 to 17,000, parts per million total dissolved solids (TDS).

The surfactant system used for in situ genesis of macroemulsion for selectively plugging the permeable zones contains less than 1 weight percent oil based on the total weight of the brine, surfactant, cosurfactant, and oil. Said surfactant systems can contain as little as zero percent oil. Generally small amounts of residual oil in the surfactant can be tolerated at levels of less than one percent.

The invention is applicable to altering the permeability profile of any subterranean formation containing connate water with high concentrations of divalent cations such as $Ca^{++}$ and $Mg^{++}$. By high concentration is meant at least 300 to 10,000 ppm by weight divalent ions based on the weight of the connate water.

The injected surfactant system for use in selectively plugging the more permeable zone has a viscosity of less than 5 centipoise as determined by a Brookfield viscometer at 6 rpm using a UL adapter at room temperature. Because of the surfactant system's low viscosity, channeling into the high permeability zones of the formation results and therein on contact with connate water containing high concentrations of divalent cations, a macroemulsion results. Thus, in the case of tertiary oil recovery, the water permeability of these thief zones is diminished and subsequently injected drive fluids are diverted to the less permeable, relatively oilrich areas resulting in the displacement of more oil and thereby improving the oil-water ratio of the producing well.

After plugging the relatively more permeable zones by practicing the instant invention, any conventional secondary or tertiary oil recovery system can be used for enhanced oil production. Preferably, it is a system as described in U.S. Pat. No. 4,079,785 comprising the injection of a surfactant system which forms a microemulsion in situ followed by a mobility buffer and drive fluid. Such a surfactant system can be identical to that utilized for forming the instant macroemulsion in situ except that the total dissolved solids concentration can be greater and more than 1 percent oil can be tolerated. Specifically, a total dissolved solids concentration (TDS) within the range of 250 to 100,000, preferably 2,000 to 50,000 parts per million can be utilized. The surfactant and cosurfactant can be identical to that described hereinabove for forming the macroemulsion in situ.

Thus, the inventive sequence of steps comprises the injection of the surfactant system for forming a macroemulsion in situ on contacting hard brine connate water to selectively plug the more permeable zones, followed by a conventional secondary or tertiary oil recovery process. A typical tertiary oil recovery process can comprise the injection of a surfactant system as described in U.S. Pat. No. 4,079,785 cited hereinabove to form a microemulsion in situ followed by a mobility buffer and drive fluid to transport reservoir oil toward a producing well. If desired, a preflush can precede the surfactant system to lower the concentration of divalent ions in the connate water.

The mobility buffer can be any aqueous or nonaqueous fluid containing mobility-reducing agents such as high molecular weight partially hydrolyzed polyacrylamides, polysaccharides, soluble cellulose ethers and the like. The drive fluid can be aqueous or nonaqueous and can be a liquid, gas, or combination of the two. Generally, it is formation water or water similar thereto.

EXAMPLE I

Two surfactant systems comprising 3.6 active weight percent of a sodium petroleum sulfonate (purified Witco TR 10-410) with an equivalent weight of about 420, 3 weight percent of an isobutyl alcohol cosurfactant, and a brine solution containing about 15,000 ppm NaCl were prepared. One contained 1.5 weight percent oil based on the weight of the entire surfactant system and the other contained 0.7 weight percent oil. Each of these was mixed with a brine containing 0.05 weight percent divalent cations. The system containing 1.5 percent oil did not produce a macroemulsion whereas the system containing 0.7 weight percent oil did produce a macroemulsion.

The surfactant system for plugging the more permeable zones can be introduced in an amount within the range of 0.001 to 0.1, preferably 0.01 to 0.05 pore volumes based on the pore volume of the total formation being treated. In accordance with the present invention, this laboratory test demonstrates the formation of a macroemulsion capable of selectively plugging the more permeable zones.

CALCULATED ILLUSTRATIVE EMBODIMENT

The following computer calculation based on results from Example I demonstrates the invention described herein.

A reservoir containing 100 feet of oil bearing formation with a residual oil saturation of 70 percent is divided into 5 layers of 20 feet each having the average permeabilities listed in Table I.

| Average Permeabilities For Reservoir Layers | |
|---|---|
| Layer | Permeability, md |
| 1 | 1749 |
| 2 | 428 |
| 3 | 204 |
| 4 | 98 |
| 5 | 34 |

A 3 percent pore volume slug of surfactant system A (the system of Example I containing 0.7 percent oil) designed to form an emulsion when contacted with divalent cations found in the reservoir brine is injected ahead of a 10 percent pore volume slug of surfactant system B. The surfactant system B is followed by a 50 percent pore volume slug of a mobility buffer and then a one pore volume slug of chase water.

This case was compared with a base where no surfactant system A was injected ahead of the surfactant system B. Table II lists the results of the two cases.

| Comparison of Results of Two Cases | |
|---|---|
| Case Description | Tertiary Oil Recovery % |
| Base case - no surfactant System A | 39 |
| 0.03 pore volume of surfactant System A | 47 |

The well treatment of pore volume (0.03 pore volume based on 1 pore volume for the entire reservoir) of surfactant system A before the surfactant flood led to an improvement of over 20 percent in the tertiary oil recovery based on this computer simulation.

While this invention has been described in detail for the purpose of illustration, it is not to be construed as limited thereby but is intended to cover all changes and modifications within the spirit and scope thereof.

We claim:

1. A process for recovering oil from a subterranean oil-bearing reservoir having zones of varying permeability and containing connate water having divalent ions comprising the steps of:
   (a) injecting into said reservoir through at least one injection well a surfactant system, thereby selectively plugging high permeability zones, said surfactant system comprising: water; 0.5 to 12 weight percent based on the weight of said water of a petroleum sulfonate surfactant having an average equivalent weight within the range of 375 to 500; 250 to 17,000 parts per million by weight of a predominantly sodium chloride electrolyte based on the weight of said water; and 1 to 12 weight percent based on the weight of said water of a cosurfactant selected from the group consisting of amides, amines, esters, aldehydes and ketones containing 1 to 20 carbon atoms and alcohols containing 4 to 7 carbon atoms, which cosurfactant has a solubility in water within the range of 0.5 to 20 grams per 100 grams of water, said surfactant system having less than 1 weight percent oil;

(b) thereafter injecting a secondary or tertiary oil recovery system through at least one injection well so as to displace oil toward at least one recovery well; and (c) recovering oil from said at least one production well.

2. A method according to claim 1 wherein said connate water has a concentration of divalent ions within the range of 300 to 10,000 ppm.

3. A method according to claim 2 wherein said divalent ions are predominantly calcium and magnesium.

4. A method according to claim 3 wherein said surfactant system of (a) is injected in an amount within the range of 0.01 to 0.05 pore volume of said reservoir.

5. A method according to claim 3 wherein the cosurfactant of step (a) is selected from the group consisting of amides, amines, esters, aldehydes and ketones having a solubility in water within the range of 2 to 10 grams per 100 grams of water.

6. A method according to claim 1 wherein said petroleum sulfonate has an equivalent weight of about 420, said cosurfactant is isobutyl alcohol and said electrolyte is present in an amount of about 15,000 parts per million.

7. A method according to claim 1 wherein the secondary or tertiary oil recovery system of step (b) comprises a surfactant system capable of forming a microemulsion in situ.

8. A method according to claim 7 wherein the surfactant system is followed by a mobility buffer and drive fluid.

9. A method according to claim 7 or claim 10 wherein the surfactant system of (b) comprises: water; 1 to 7 weight percent based on the weight of said water of a petroleum sulfonate surfactant having an average equivalent weight within the range of 375 to 500; 250 to 100,000 parts by million by weight of an electrolyte based on said water; and 1 to 12 weight percent based on the weight of said water of a cosurfactant, which cosurfactant has a solubility in water within the range of 5 to 20 grams per 100 grams of water, which surfactant system is thereafter followed by an injection of a mobility buffer and finally by the injection of a drive fluid.

10. A method according to claim 9 in which step (b) is preceded by a preflush to lower the concentration of divalent ions.

11. A method according to claim 1 or claim 9 wherein the cosurfactant of step (a) is at least one alcohol containing 4 to 7 carbon atoms.

12. A method according to claim 11 wherein the cosurfactant is selected from the group consisting of isobutyl alcohol, secondary butyl alcohol, n-butyl alcohol, n-amyl alcohol and isoamyl alcohol.

13. A method according to claim 12 wherein the cosurfactant is isobutyl alcohol.

14. A method according to claim 13 wherein the electrolyte is present in an amount within the range of 2,000 to 17,000 parts per million total dissolved solids and the petroleum sulfonate has an average equivalent weight within the range of 400 to 425.

15. A process for recovering oil from a subterranean oil-bearing reservoir having zones of varying permeability and containing connate water having divalent ions comprising the steps of:

(a) injecting into said reservoir through at least one injection well a surfactant system comprising: water; 0.5 to 12 weight percent based on the weight of said water of a petroleum sulfonate surfactant having an average equivalent weight of about 420; 15,000 parts per million by weight of a predominantly sodium chloride electrolyte based on the weight of said water; and 1 to 12 weight percent based on the weight of said water of a cosurfactant, which cosurfactant is isobutyl alcohol, said surfactant system having less than 1 weight percent oil;

(b) thereafter injecting a secondary or tertiary oil recovery system through at least one injection well so as to displace oil toward at least one recovery well, wherein said secondary or tertiary oil recovery system is a surfactant system comprising: water; 1 to 7 weight percent based on the weight of said water of a petroleum sulfonate surfactant having an average equivalent weight within the range of 375 to 500; 250 to 100,000 parts per million by weight of an electrolyte based on said water; and 1 to 12 weight percent based on the weight of said water of a cosurfactant, which cosurfactant has a solubility in water within the range of 0.5 to 20 grams per 100 grams of water, which surfactant system is thereafter followed by an injection of a mobility buffer and finally by the injection of a drive fluid.

16. A method according to claim 15 wherein said injection of (b) is preceded by a preflush to lower the concentration of divalent ions.

17. A method according to claim 16 wherein said electrolyte of (b) is present in an amount within the range of 2,000 to 50,000 ppm.

* * * * *

UNITED STATES PATENT AND TRADEMARK OFFICE
CERTIFICATE OF CORRECTION

PATENT NO. : 4,296,811
DATED : October 27, 1981
INVENTOR(S) : Charles W. Morris et al It is certified that error appears in the above-identified patent and that said Letters Patent are hereby corrected as shown below:

Column 5, line 33 (claim 9), "10" should read --- 8 ---.

Signed and Sealed this

Twenty-ninth Day of June 1982

[SEAL]

Attest:

GERALD J. MOSSINGHOFF

Attesting Officer        Commissioner of Patents and Trademarks